Aug. 4, 1964
I. J. NIEMKIEWICZ
3,143,676
SEALING ARRANGEMENT FOR CANNED PUMPS
Filed Oct. 17, 1960
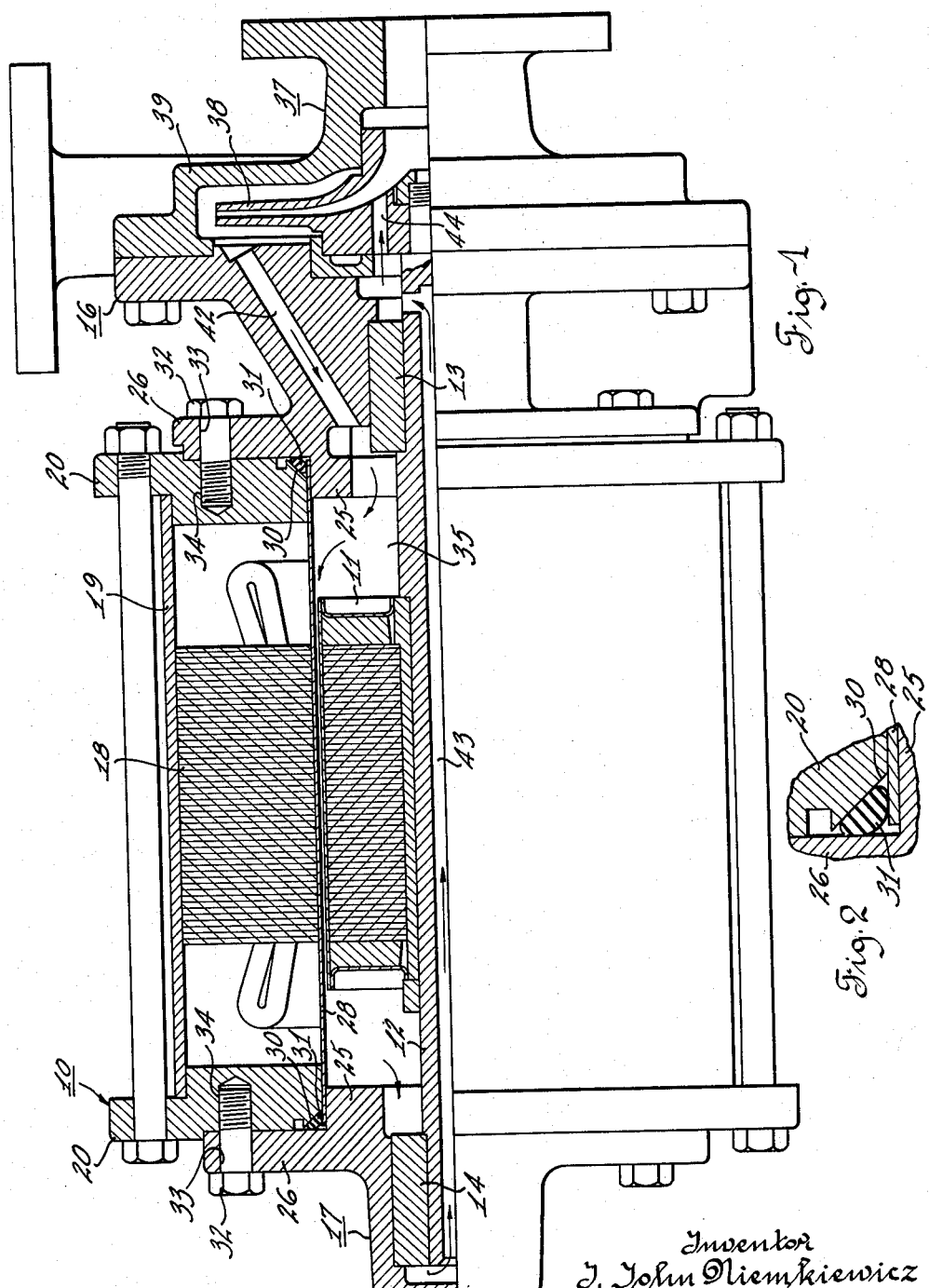
Inventor
J. John Niemkiewicz
By Robert B. Benson
Attorney

United States Patent Office 3,143,676
Patented Aug. 4, 1964

3,143,676
SEALING ARRANGEMENT FOR CANNED PUMPS
Ignatius J. Niemkiewicz, Cincinnati, Ohio, assignor to Allis-Chalmers Manufacturing Company, Milwaukee, Wis.
Filed Oct. 17, 1960, Ser. No. 63,187
1 Claim. (Cl. 310—86)

This invention relates generally to canned motors. More specifically this invention relates to the sealing of the stator can in a canned motor.

A canned motor is a motor which literally has a canned rotor or a canned stator, or both. The purpose of the can is to protect the windings in the rotor and in the stator from the fluid circulating through the motor. These motors have particular application in driving fluid handling devices such as pumps which are handling highly corrosive, precious or hazardous liquids under conditions which render ordinarily hydraulic seals relatively ineffective.

In the canned motors of the prior art a cylindrical member of thin material is positioned in the motor air gap and extends to the end housing on either side of the rotor. The cylindrical member or can is then permanently sealed to the end housing by welding or some other suitable means. Such a construction forms an excellent seal that prevents the fluid circulating around a rotor from entering the stator chamber. However, in practice, whenever the motor has to be torn down for maintenance or inspection, the seal between the stator can and the end housing has to be broken. In breaking the seal the stator can is destroyed and is incapable of being reused.

Another form of stator can used in the prior art is a can having tapered portions at one or both ends. This can is clamped between complementary tapered surfaces on the bearing housings and end housings to seal the stator. This can provides an excellent seal but is much more costly than the straight can described above. On the other hand, the can with the tapered surfaces is a reusable can in the sense that the motor can be dismantled without damaging the stator can.

Another can arrangement in the prior art utilizes a straight can which fits into recesses in the end housing. The recesses are filled with a compressible gasket which engages the ends of the can. In this arrangement the axial length of the stator can is very critical and special care is required in manufacturing the cans and assembling the motors. The can has to be long enough to engage the gaskets initially in sealing relation and to retain that sealing arrangement during operation of the motor when the can and other parts of the motor expand and contract at different rates. Furthermore, the can cannot be too long because it may rupture the gasket or even buckle during operation thereby rendering the seal ineffective. In actual practice it has been found that in most installations of this type of motor even where there was no leakage during operation the gaskets had to be replaced upon reassembly because they were either permanently deformed or had been ruptured by the edges of the stator can.

There has been an effort in the motor and pump industry to provide a straight can which will adequately seal in the canned motor and that will also be reusable after the motor has been dismantled for inspection or service. Such a can is provided with this invention. The canned motor of this invention has a straight cylindrical can positioned between the motor end housings and the bearing housings. An O-ring type gasket surrounds the can near its end and is compressed between the can and the bearing and end housings to form a uniform seal around the entire periphery of the can. Furthermore, the gasket is compressed against the bearing housing to prevent any leakage of fluid from the motor to atmosphere between the end housing and the bearing housing. By utilizing this type of an arrangement, applicant is able to provide a canned motor having a simple inexpensive straight cylindrical can that provides excellent sealing and may be reused after the motor has been disassembled. Because the can is not attached, such as by welding to any of the parts of the motor, it can better withstand the differential expansion between the can and the other parts of the motor during operation. Also, since the can does not have to be welded to the other members of the motor frame, the assembly of the unit is much simpler and less expensive. Furthermore, since the seal is on the outside of the stator can the axial length of the can is not critical and close tolerances are not necessary in the manufacturing of the can.

Therefore, it is the object of this invention to provide a new and improved canned motor.

Another object of this invention is to provide a new and improved sealing means for a canned motor.

Another object of this invention is to provide a canned motor having a reusable stator can.

Another object of this invention is to provide a new and improved, more economical canned motor that is easier to assembled than prior art canned motors.

Another object of this invention is to provide a new and improved combined motor pump unit.

Other objects and advantages of this invention will be apparent from the following description when read in connection with the accompanying drawings in which:

FIG. 1 is a side view partially in section of a canned motor pump unit embodying this invention; and FIG. 2 is an enlarged cross sectional view of the sealing arrangement used in the canned motor illustrated in FIG. 1.

As shown in the drawing, the canned motor of this invention is shown in combination with a centrifugal pump. The motor 10 comprises a rotor 11 mounted on a shaft 12 which is journaled in bearings 13 and 14. The bearings 13, 14 are in turn mounted in the front and rear bearing housings 16 and 17, respectively. The rotor 12 is surrounded by a suitable stator 18 which is in turn mounted in a cylindrical yoke on stator casing 19. The stator casing 19 is provided at each end with an annular end housing 20.

Each bearing housing 16, 17 is provided with an axial inwardly extending cylindrical flange 25 and a radial outwardly extending flange 26. The radial flanges 26 are positioned just outside of the end housings 20. The inner cylindrical surface of the end housings 20 is spaced radially from the outer cylindrical surface of the flanges 25 of the bearing housing. A straight cylindrical stator can 28 surrounds the rotor 11 and extends into the space between the end housings 20 and the flanges 25 of the bearing housings.

A recess is formed in the end housing for receiving a resilient gasket for sealing the rotor chamber from the stator. In the illustrated embodiment a corner of the end housings 20 near the radial flange 26 of the bearing housings 16, 17 is removed in such a manner as to provide a tapered surface 30 which combines with the end housings and the stator can 28 to define an annular space for receiving and confining a resilient type gasket such as the O-ring 31. The O-ring surrounds the stator can near its end and contacts the inner surface of the radial flange 26 of the bearing housings and the tapered surface 30 of the end housing in addition to the can. In this arrangement, when the radial flange 26 of the bearing housing is drawn up tight against the end housing 20, the O-ring 31 is compressed against the flange 26 and the can 28 by the tapered surface 30. The O-ring then forms a seal with the exterior surface at the stator can 28 and the radial flange 26 of the bearing housing.

The end housing is drawn up against the bearing housing by any suitable means such as the bolts 32 shown extending through holes 33 in the radial flange 26 of the bearing housings 16, 17 and engaging threaded holes 34 in the end housing 20. When completely assembled, the rotor chamber 35 defined by the bearing housings and the stator can are completely sealed off from the stator and atmosphere.

The motor of this invention can be used to drive any kind of a load, but is illustrated in the drawings coupled to a centrifugal pump 37. A centrifugal pump impeller 38 is mounted on the other end of the shaft 12. The impeller 38 is positioned in a casing 39 which is mounted on the bearing housing 16 in any suitable manner.

In operation, some of the fluid being pumped flows from the high pressure side of the impeller through the conduit 42 in the bearing housing 16 into the rotor chamber 35. This fluid circulates around the rotor chamber to cool the rotor and lubricate the bearings 13, 14 and is returned through the conduit 43 in the hollow shaft 12 and the axially extending holes 44 near the hub of the impeller 38 to the low pressure side of the pump. The fluid flow through the motor is illustrated by arrows in the drawing.

In assembling the unit the stator housing 19 is positioned over the stator 18 and the end housings 20 are bolted together at either end of the stator housing. The stator can is then positioned within the stator and snugly fits within the radially inner surface of the end housing. An O-ring type gasket is then placed around the outer perimeter of the stator can at the ends of the can. This gasket sits within the trough shaped annular opening between the motor end housings and the can. The rotor is then mounted on the shaft and positioned within the stator can. The bearing housings are then positioned with their axially extending flange 25 fitted within the stator can 28 and their radial flanges adjacent the end housings 20. The bearing housings are then drawn up tightly against the motor end housings by means of the bolts 32. As the bearing housings and end housings are being drawn together the gasket is compressed against the end housing and the outer surface of the stator can to form a uniform seal. The gasket is normally of circular cross section, but is deformed by this compressive action so as to tightly engage the end housings, the bearing housings and the stator cans.

Although but one embodiment of the present invention has been illustrated and described, it will be apparent to one skilled in the art that various changes and modifications may be made therein without departing from the spirit of the invention or from the scope of the appended claim.

Having now particularly described and ascertained the nature of my said invention and the manner in which it is to be performed, I declare that what I claim is:

A canned motor comprising: a cylindrical housing; a pair of annular end members attached to said housing; a motor stator mounted within said housing; bearing means having an outwardly extending flange positioned adjacent an associated said end member and an axial flange extending inwardly within said associated end member; a shaft rotatably mounted in said bearing means; a motor rotor mounted on said shaft and positioned within said stator; a cylindrical can surrounding said rotor and said axial flanges, the radially inner portion of said end members adjacent said outwardly extending flanges being tapered to form with said flanges an annular space; and resilient sealing means surrounding each end of said can and compressively confined within said annular space to seal the interior of said can from said stator and atmosphere.

References Cited in the file of this patent

UNITED STATES PATENTS

| | | |
|---|---|---|
| 2,669,667 | Haines | Feb. 16, 1954 |
| 2,709,965 | Litzenberg | June 7, 1955 |
| 2,734,459 | Zimsky | Feb. 14, 1956 |
| 2,741,990 | White | Apr. 17, 1956 |
| 2,777,462 | Maynard | Jan. 15, 1957 |
| 2,777,963 | Kuntz | Jan. 15, 1957 |
| 2,796,835 | White | June 25, 1957 |
| 2,939,399 | Rutschi | June 7, 1960 |
| 2,956,188 | White | Oct. 11, 1960 |
| 2,972,308 | Haggerty | Feb. 21, 1961 |